United States Patent

Cho

[11] Patent Number: 5,933,105
[45] Date of Patent: Aug. 3, 1999

[54] CONTEXT-BASED ARITHMETIC ENCODING/DECODING METHOD AND APPARATUS

[75] Inventor: Sung-Ryul Cho, Seoul, Rep. of Korea

[73] Assignee: Daewoo Electronics Co., Ltd., Rep. of Korea

[21] Appl. No.: 09/012,631

[22] Filed: Jan. 23, 1998

[51] Int. Cl.[6] .............................. H03M 7/30; H04N 1/417
[52] U.S. Cl. .............................. 341/107; 348/416; 341/50
[58] Field of Search .................................. 341/50, 51, 52, 341/107; 348/416, 420, 412; 382/232

[56] References Cited

U.S. PATENT DOCUMENTS

| | | | |
|---|---|---|---|
| 4,546,386 | 10/1985 | Matsumoto et al. | 348/412 |
| 5,245,678 | 9/1993 | Eschbach et al. | 382/50 |
| 5,422,734 | 6/1995 | Kang | 358/429 |
| 5,666,461 | 9/1997 | Igarashi et al. | 386/95 |
| 5,764,374 | 6/1998 | Seroussi et al. | 358/427 |
| 5,835,034 | 11/1998 | Seroussi et al. | 341/65 |

FOREIGN PATENT DOCUMENTS

2286942  8/1995  United Kingdom.

Primary Examiner—Marc S. Hoff
Assistant Examiner—Peguy JeanPierre
Attorney, Agent, or Firm—Anderson, Kill & Olick

[57] ABSTRACT

An apparatus encodes a binary shape signal by using a modified context-based arithmetic encoding technique. The apparatus computes a context number of each binary pixel in the binary shape signal based on its corresponding context. Then, a probability corresponding to the context number is detected and a state of each binary pixel is determined by comparing the probability with a preset threshold value. Furthermore, a predicted pixel value corresponding to each binary pixel is decided based on the probability. The predicted pixel value is compared with an original pixel value of each binary pixel to thereby output a mapping value representing whether the predicted pixel value is identical to the original pixel value or not. The apparatus generates a first and a second sequences by rearranging the mapping values of the binary pixels in the binary shape signal according to the states of the binary pixels and assigns adaptive probability sets to the first and the second sequences, respectively. The first and the second sequences are arithmetically encoded based on the adaptive probability sets to thereby produce an encoded binary shape signal.

15 Claims, 6 Drawing Sheets

CONTEXT-BASED ARITHMETIC ENCODING/DECODING METHOD AND APPARATUS

FIELD OF THE INVENTION

The present invention relates to a method and apparatus for coding/decoding a binary shape signal; and, more particularly, to a context-based arithmetic encoding/decoding method and apparatus for enhancing a coding efficiency of the binary shape signal.

DESCRIPTION OF THE PRIOR ART

A binary shape signal, representing the location and shape of an object, can be expressed as a binary alpha block (BAB) of, e.g., 16×16 binary pixels within a frame (or a video object plane), wherein each binary pixel has a binary value, e.g., 0 or 1, representing either a background pixel or an object pixel. A BAB can be encoded by using a conventional bit-map-based shape coding method such as a context-based arithmetic encoding (CAE) method.

Figure 1:
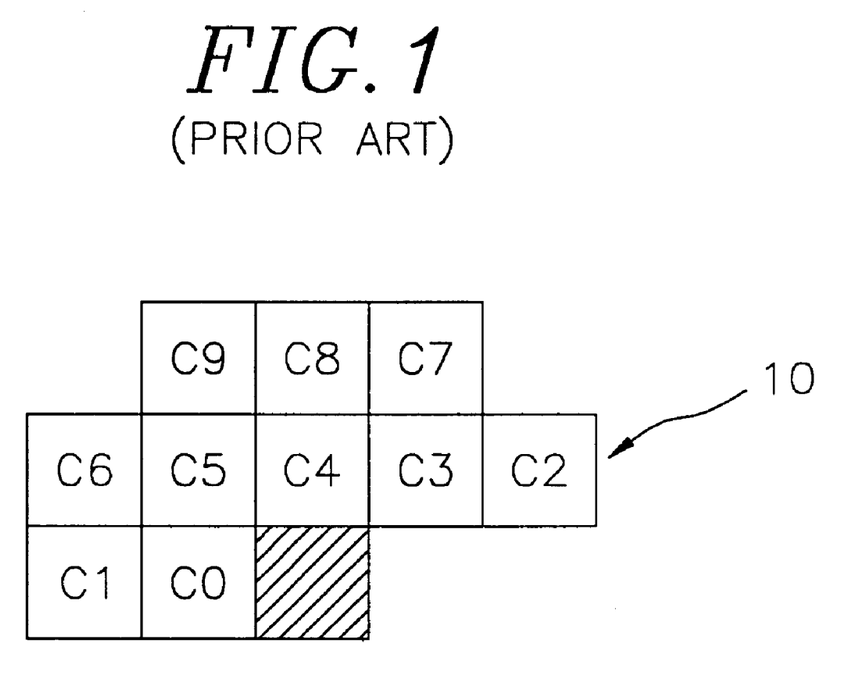
FIG. 1 shows an intra template and context construction.
Figure 3:
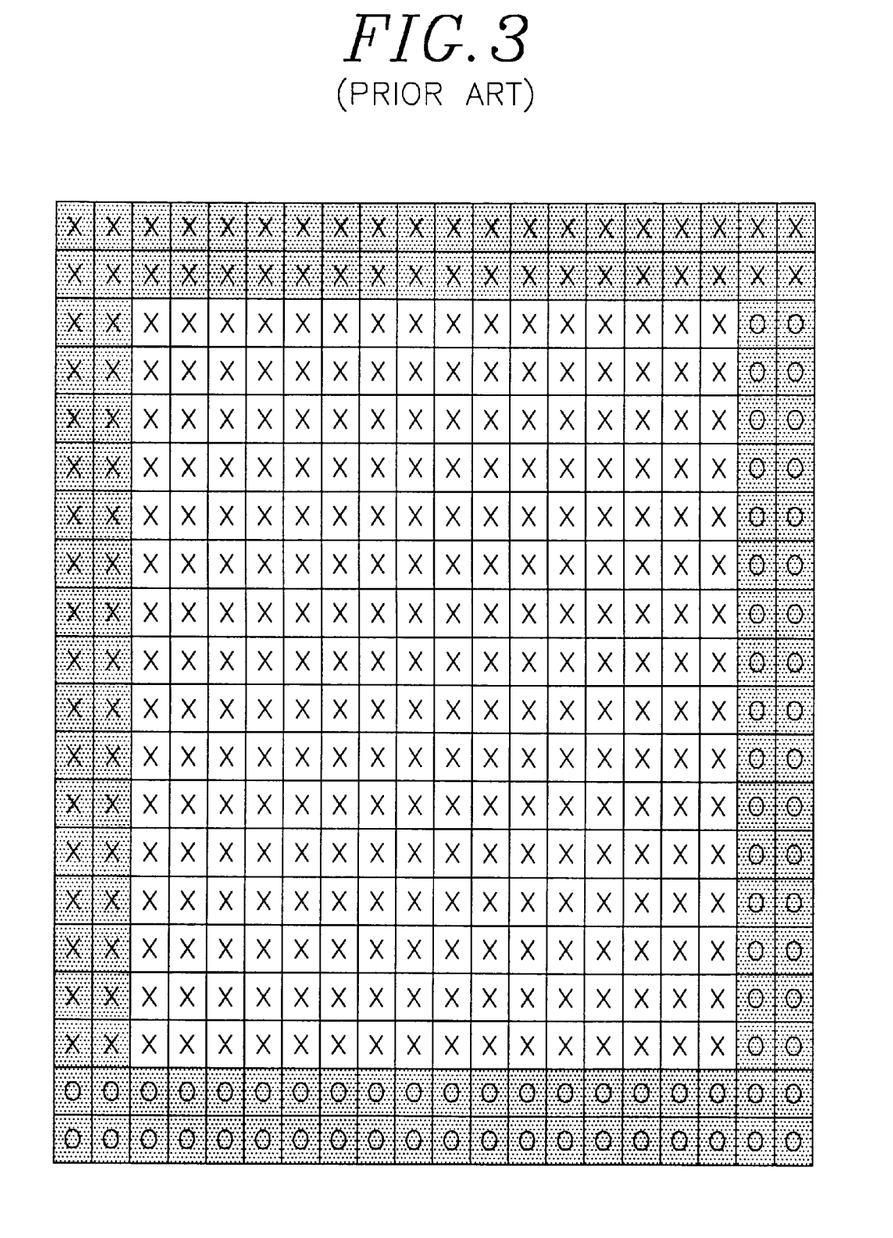
FIG. 3 describes a current bordered BAB.

For instance, for an intra-frame, a current BAB is encoded by using a conventional intra-CAE method, wherein each pixel in the current BAB is arithmetically coded based on an intra-context comprised of a set of pixels selected from a current frame. In other words, when encoding the current BAB, pixels from neighboring BAB's are used to make up the intracontext. A border of width 2 around the current BAB is used as depicted in FIG. 3 in order to provide a current bordered BAB. In FIG. 3, the pixels in the light grey area of the current bordered BAB are the part of the current BAB to be encoded and the pixels in the dark area of the current bordered BAB are the border pixels. These are obtained from previously encoded and reconstructed BAB's except for those marked '0' which are unknown at a decoding time. Based on the current bordered BAB, the intra-context is selected as shown in FIG. 1. Therefore, in FIG. 1, a shaded pixel, i.e., a pixel in the current BAB, is encoded by using its intracontext 10, e.g., C0 to C9.

Figure 2A:
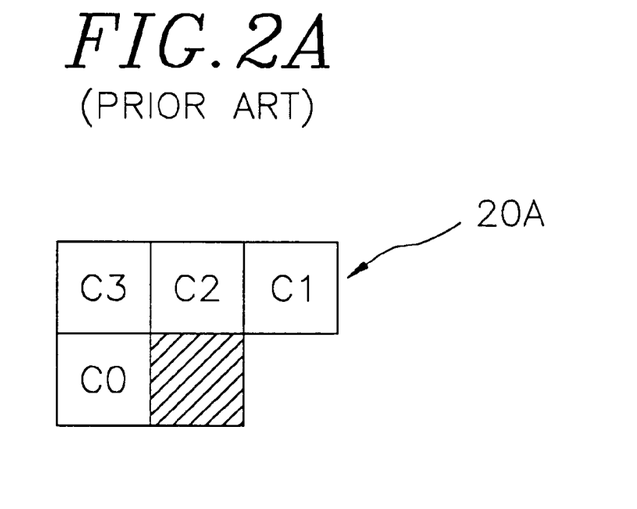
FIGS. 2A and 2B represent an inter template and context construction.
Figure 2B:
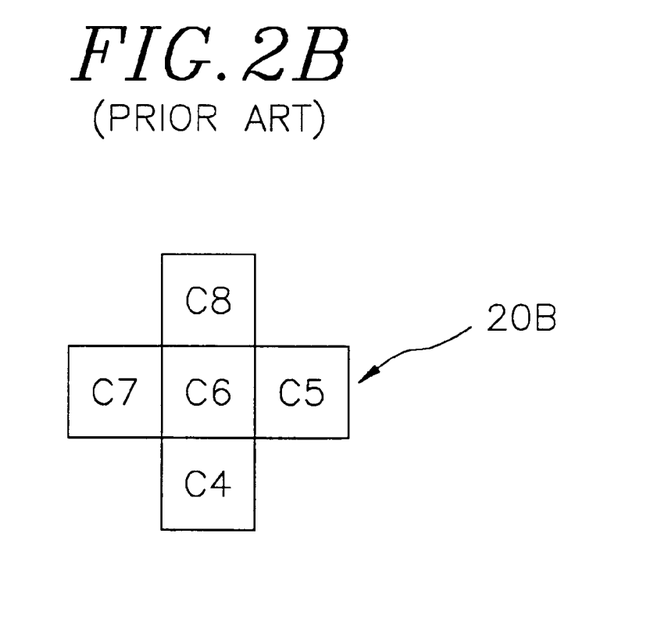
Figure 4:
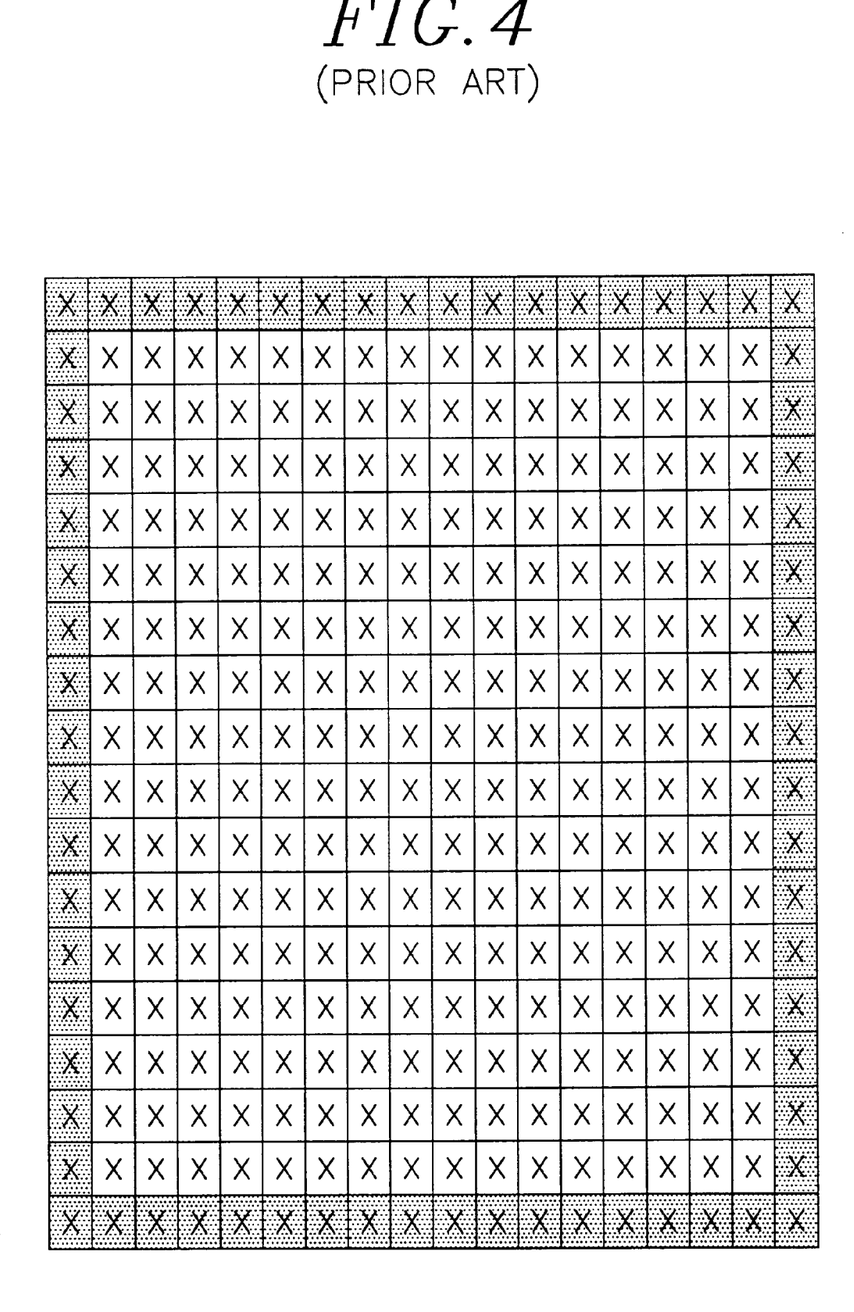
FIG. 4 illustrates a bordered motion compensated BAB.

For an inter-frame, the current BAB may be coded by using either the intra-CAE or an inter-CAE technique depending on whichever CAE technique between the two generates a less amount of encoded data. According to the inter-CAE technique, an error representing a difference between the current BAB and each of predetermined candidate BAB's thereof included in a previous frame is calculated first and a most similar candidate BAB and a motion vector are found by a motion estimation technique, wherein the most similar candidate BAB represents a candidate BAB generating a least error among the candidate BAB's and the motion vector denotes a displacement between the current BAB and the most similar candidate BAB. Thereafter, each pixel in the current BAB is arithmetically coded based on an inter-context and a motion vector difference (MVD) representing a difference between the motion vector and a motion vector predictor (MVDP) thereof is encoded by using, e.g., a variable length coding (VLC) scheme. Referring to FIGS. 2A and 2B, the inter-context is composed of two subsets of pixels, a first subset of pixels 20A, e.g., C0 to C3, in FIG. 2A being selected from pixels in the current frame in a similar manner that is used in the intra-CAE and a second subset of pixels 20B, e.g., C4 to C8, in FIG. 2B being chosen from the previous frame based on the motion vector. Namely, a border of width 1 around a motion compensated BAB, detected from the previous frame by using the motion vector, is utilized to supply a bordered motion compensated BAB as described in FIG. 4. In FIG. 4, the light grey area corresponds to the motion compensated BAB and the dark area corresponds to the border. Once the bordered motion compensated BAB is determined, the second subset of pixels 20B containing the binary pixels C4 to C8 is selected from the bordered motion compensated BAB, wherein the pixel position of the pixel C6 is identical to that of the shaded pixel.

Accordingly, either the intra-context or the intercontext is selected as illustrated above and a context number of the shaded pixel in the current BAB is calculated based on its corresponding context. Once the context number of the shaded pixel is ciphered, a probability corresponding to the context number is detected from a probability table containing predetermined probabilities assigned to various context numbers and the detected probability is arithmetically encoded to thereby produce an encoded binary shape signal. Further details of the CAE techniques and the MVD can be found in *MPEG-4 Video Verification Model Version 7.0*, International Organization for Standardization, Coding of Moving Pictures and Associated Audio Information, ISO/IEC JTC1/SC29/WG11 MPEG97/N1642, Bristol, April 1997.

Although the number of bits to be transmitted is reduced through the use of the conventional CAE technique as discussed above, a large number of bits are still needed in transmitting the binary shape signal. Accordingly, a further reduction in the number of bits used in encoding the binary shape signal is desired.

SUMMARY OF THE INVENTION

It is, therefore, a primary object of the present invention to provide a method and apparatus for adaptively coding a binary shape signal by using an adaptive arithmetic encoding technique so as to reduce the amount of transmission data.

In accordance with one aspect of the present invention, there is provided a method for encoding a binary shape signal including a plurality of binary blocks, each binary block having M×N binary pixels with M and N being positive integers, respectively, and each binary pixel has one of two different binary values which represent an outside and an inside of an object, respectively, comprising the steps of: (a) calculating a context number of a target pixel based on a corresponding context and detecting a probability corresponding to the context number, wherein the target pixel is one of binary pixels in the binary block and the context is determined from binary pixels processed prior to the target pixel; (b) determining a state and a predicted pixel value of the target pixel by comparing the probability of the target pixel with threshold values; (c) computing a mapping value of the target pixel by comparing the predicted pixel value with an original pixel value thereof, wherein the mapping value represents whether the predicted pixel value is identical to the original pixel value or not; (d) repeating the steps (a) to (c) until all of the binary pixels in the binary block are processed; (e) producing a rearranged binary block divided to a first and a second sequences, wherein the first and the second sequences are constructed by classifying the binary pixels of the binary block according to the states thereof; and (f) arithmetically encoding the first and the second sequences to thereby produce the encoded binary shape signal.

In accordance with a second aspect of the present invention, there is provided an apparatus for encoding a binary shape signal including a plurality of binary blocks, each binary block having M×N binary pixels with M and N being positive integers, respectively, and each binary pixel has one of two different binary values which represent an outside and an inside of an object, respectively, comprising: a context number calculation unit for ciphering a context number for each of the binary pixels in the binary block based on a corresponding context and detecting a probability corresponding to the context number, wherein the context is determined from binary pixels processed prior to each of the binary pixels; a state determination unit for deciding a state and a predicted pixel value of each of the binary pixels by comparing the probability with threshold values; a comparison unit for computing a mapping value for each of the binary pixels by comparing the predicted pixel value with an original pixel value thereof, wherein the mapping value represents whether the predicted pixel value is identical to the original pixel value or not; a rearrangement unit for producing a rearranged binary block divided to a first and a second sequences, wherein the first and the second sequences are constructed by classifying the binary pixels of the binary block according to the states thereof; and an adaptive arithmetic encoding unit for arithmetically encoding the first and the second sequences to thereby produce the encoded binary shape signal.

In accordance with a third aspect of the present invention, there is provided an apparatus for decoding an encoded binary shape signal to thereby provide a decoded binary shape signal, comprising: an adaptive arithmetic decoding unit for arithmetically decoding the encoded binary shape signal based on probability sets to thereby provide decoded binary shape data containing a first and a second sequences, wherein the first and the second sequences have reconstructed mapping values of binary pixels; a context number calculation unit for computing a context number for each of the binary pixels based on a corresponding context and detecting a probability corresponding to the context number, wherein the context is determined from binary pixels reconstructed prior to each of the binary pixels; a state determination unit for detecting a state and a predicted pixel value of each of the binary pixels by comparing the probability with predetermined threshold values; a selection unit for taking one of the reconstructed mapping values for each of the binary pixels from the first or the second sequence in response to the state of each of the binary pixels; and a providing unit for reconstructing a binary pixel value of each of the binary pixels by comparing the taken reconstructed mapping value with the predicted pixel value and sequentially providing the reconstructed binary pixel values corresponding to the decoded binary shape data as the decoded binary shape signal.

BRIEF DESCRIPTION OF THE DRAWINGS

The foregoing and other objects, features and advantages of the present invention will become apparent from the following detailed description of preferred embodiments of the invention with reference to the accompanying drawings, in which.

DETAILED DESCRIPTION OF THE PREFERRED EMBODIMENTS

Figure 5:
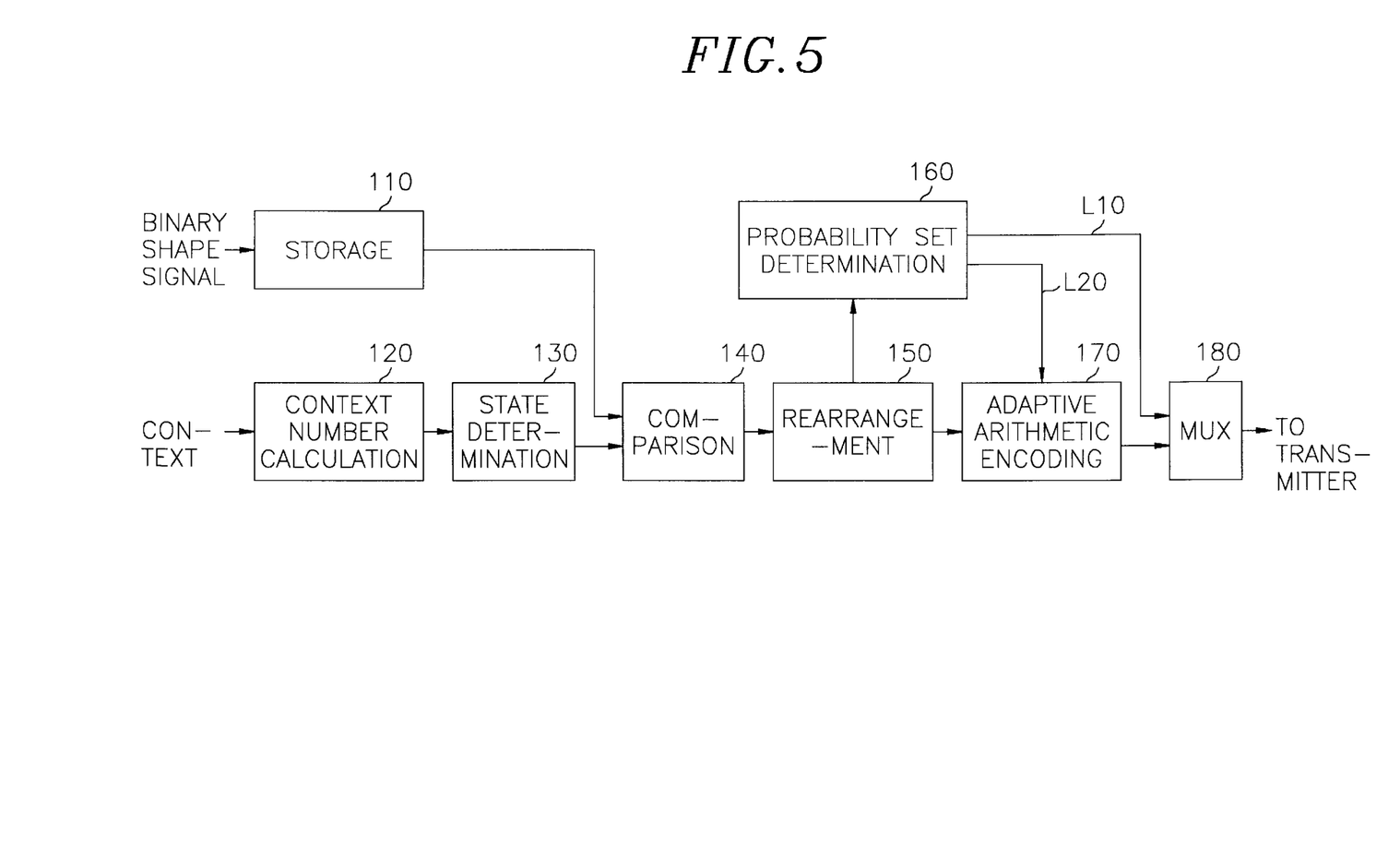
FIG. 5 is a block diagram of a context-based arithmetic encoding apparatus in accordance with the present invention.

Referring to FIG. 5, there is provided a block diagram of a context-based arithmetic encoding apparatus in accordance with a preferred embodiment of the present invention.

A binary shape signal contains a plurality of binary blocks, each binary block having M×N, e.g., 16×16, binary pixels and each binary pixel including a binary value, e.g., 1 or 0, representing either an object pixel or a background pixel, wherein M and N are positive integers, respectively. Each block of the binary shape signal is coupled to a storage unit 110 and is stored therein as a current binary block. Then, each of binary pixels in the current binary block is provided to a comparison unit 140 as a current pixel.

In the meantime, a context number calculation unit 120 ciphers a context number corresponding to each of the binary pixels in the current binary block in the same manner used at the conventional CAE technique by using its corresponding context, i.e., either an intra-context or an inter-context. The context number calculation unit 120 also detects a probability corresponding to the context number based on the probability table as has been done in the prior art. The context number and its probability are provided to a state determination unit 130 as a current context number and a current probability corresponding to the current pixel, respectively.

The state determination unit 130 compares the current probability from the context number calculation unit 120 with a preset threshold value in order to determine whether the current pixel having the current context number belongs to a good state or a bad state. If the current probability is determined to be greater than or equal to the preset threshold value in the comparison, the current pixel is decided as the good state and, if otherwise, the current pixel is determined as the bad state. The state determination unit 130 issues a state indication signal representing the state of the current pixel to the comparison unit 140. The state determination unit 130 also provides a predicted pixel value corresponding to the current pixel to the comparison unit 140. The predicted pixel value is determined by comparing the current probability with a prediction threshold value, e.g., a half value of the maximum probability. According to the probability table which has been determined by considering, e.g., a binary value 0, if the current probability is greater than or equal to the prediction threshold value, a binary value 0 is determined and, if otherwise, a binary value 1 is decided as the predicted pixel value.

In accordance with another embodiment of the present invention, the preset threshold value can have two levels, e.g., a high level and a low level, in order to determine a state of a binary pixel. In other words, if the current probability is greater than or equal to the high level or smaller than the low level, the current pixel is decided as the good state and, if otherwise, i.e., if the current probability is smaller than the high level and greater than or equal to the low level, the current pixel is determined as the bad state.

Then, the comparison unit 140 compares the predicted pixel value transferred from the state determination unit 130 with the current pixel value provided from the storage unit 110. If the predicted pixel value and the current pixel value are determined to be identical to each other in the comparison, the comparison unit 140 assigns a mapping value "0" to the current pixel and, if otherwise, a mapping value "1" is assigned to the current pixel. Current pixel information, including the mapping value and the state indication signal, is coupled to a rearrangement unit 150.

The above processes are repeatedly performed for all of the binary pixels in the current binary block and, thereafter, the current pixel information for each of the binary pixels is sequentially provided to the rearrangement unit 150.

The rearrangement unit 150 stores the current pixel information for all of the binary pixels in the current binary block and produces a first and a second sequences by rearranging the mapping values in the current pixel information in response to their corresponding state indication signals. The first sequence contains the mapping values corresponding to the binary pixels determined as the good state and the second sequence has the mapping values corresponding to the binary pixels decided as the bad state. The rearrangement unit 150 also counts the number of mapping value 0's in the first and the second sequences and provides the counted numbers to a probability set determination unit 160.

The probability set determination unit 160 detects optimum probability sets corresponding to the first and the second sequences, respectively, by using the counted numbers delivered from the rearrangement unit 150 and produces a selection signal representing which probability sets are detected. The selection signal is encoded and then provided to a multiplexor 180 through a line L10 and the optimum probability se-s are fed to an adaptive arithmetic encoding unit 170 via a line L20.

In accordance with the present invention, as the counted number increases, a probability assigned to the mapping value having a digit 0 becomes larger, while a probability assigned to the mapping value having a digit 1 becomes smaller.

The adaptive arithmetic encoding unit 170 codes the first and the second sequences by using known arithmetic encoding techniques based on the optimum probability sets provided from the probability set determination unit 160 via the line L20 to thereby provide encoded binary data to the multiplexor 180.

At the multiplexor 180, the encoded binary data from the adaptive arithmetic encoding unit 170 and the encoded selection signal from the probability set determination unit 160 are multiplexed to thereby produce an encoded binary shape signal to be transmitted through a transmitter(not shown).

Figure 6:
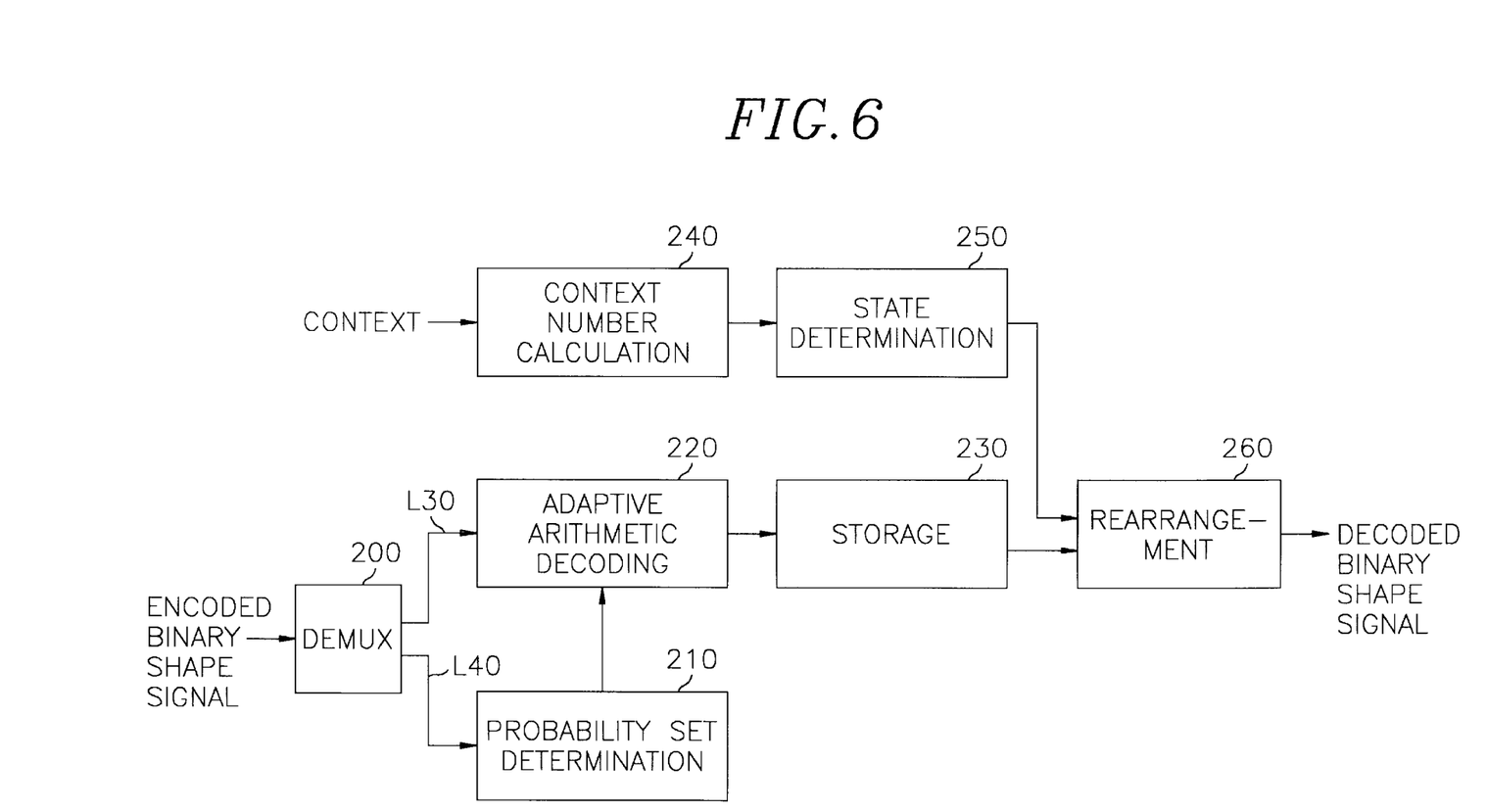
FIG. 6 provides a block diagram of a context-based arithmetic decoding apparatus in accordance with the present invention.

In FIG. 6, there is provided a block diagram of a context-based arithmetic decoding apparatus in accordance with the preferred embodiment of the present invention.

The encoded binary shape signal transmitted through a transmission channel is inputted to a demultiplexor 200.

The demultiplexor 200 divides the encoded binary shape signal into an encoded selection signal and encoded binary data. The encoded selection signal is coupled to a probability set determination unit 210 via a line L40 and the encoded binary data is provided to an adaptive arithmetic decoding unit 220 through a line L30.

The probability set determination unit 210 decodes the encoded selection signal so as to produce a decoded selection signal and detects probability sets in response to the decoded selection signal.

The adaptive arithmetic decoding unit 220 decodes the encoded binary data by using known context-based arithmetic decoding techniques corresponding to the context-based arithmetic encoding techniques used at the adaptive arithmetic encoding unit 170 in FIG. 5 based on the detected probability sets and provides the decoded binary data containing the first and the second sequences to a storage unit 230, wherein the first sequence has decoded mapping values of binary pixels determined as the good state and the second sequence includes those of binary pixels decided as the bad state. The decoded binary data consisting of the first and the second sequences is stored at the storage unit 230.

Meanwhile, a context number calculation unit 240 computes a context number of a processing binary pixel corresponding to each of the binary pixels contained in the current binary block by using its context selected from binary pixels reconstructed prior to the processing binary pixel. The context number calculated at the context number calculation unit 240 is transferred to a state determination unit 250.

The state determination unit 250 first finds a probability corresponding to the context number derived from the context number calculation unit 240 and decides a state of the processing binary pixel by comparing the probability with the preset threshold value as described in the context-based arithmetic encoding apparatus in FIG. 5. Accordingly, if the probability is greater than or equal to the preset threshold value, the processing binary pixel is determined as the good state and, if otherwise, the processing binary pixel is decided as the bad state. The state determination unit 250 produces a state designation signal representing the good or the bad state as determined for the processing binary pixel. Furthermore, a predicted pixel value of the processing binary pixel is detected based on the probability as illustrated in the context-based arithmetic encoding apparatus in FIG. 5. The predicted pixel value and the state designation signal are supplied to a rearrangement unit 260.

The rearrangement unit 260 takes a mapping value from the first or the second sequence stored at the storage unit 230 in response to the state designation signal outputted from the state determination unit 250. In other words, if the state designation signal represents the good state, the rearrangement unit 260 takes the mapping value from the first sequence stored at the storage unit 230, while if the state designation signal shows the bad state, the mapping value is detected among mapping values included in the second sequence reserved at the storage unit 230. Subsequently, the rearrangement unit 260 reconstructs a binary pixel value of the processing binary pixel by comparing the mapping value with the predicted pixel value from the state determination unit 250. If the mapping value has a digit 0, the predicted pixel value is fixed as the reconstructed pixel value. If otherwise, i.e., the mapping value has a digit 1, an inverted binary value of the predicted pixel value is determined as the reconstructed pixel value. Each reconstructed pixel value is outputted as a decoded binary shape signal.

The above decoding processes are repeatedly performed until all pixel values of the current binary block are reconstructed.

While the present invention has been described with respect to the particular embodiments, it will be apparent to those skilled in the art that various changes and modifications may be made without departing from the spirit and scope of the invention as defined in the following claims.

What is claimed is:

1. A method for encoding a binary shape signal including a plurality of binary blocks, each binary block having M×N binary pixels with M and N being positive integers, respectively, and each binary pixel having one of two different binary values which represent a background or an object pixel, respectively, comprising the steps of:

(a) calculating a context number of a target pixel based on a corresponding context and detecting a probability corresponding to the context number, wherein the target pixel is one of binary pixels in the binary block and the context is determined from binary pixels processed prior to the target pixel;

(b) determining a state and a predicted pixel value of the target pixel by comparing the probability of the target pixel with predetermined threshold values;

(c) computing a mapping value of the target pixel by comparing the predicted pixel value with an original pixel value thereof, wherein the mapping value represents whether the predicted pixel value is identical to the original pixel value or not;

(d) repeating the steps (a) to (c) until all of the binary pixels in the binary block are processed;

(e) producing a rearranged binary block, the binary block being rearranged into a first and a second sequences, wherein the first and the second sequences are constructed by classifying the binary pixels of the binary block according to the states thereof; and (f) arithmetically encoding the first and the second sequences to thereby produce the encoded binary shape signal.

2. The method as recited in claim 1, wherein the step (b) includes the steps of:

(b11) assigning a good state or a bad state to the target pixel by comparing the probability with a first predetermined threshold value, wherein if the probability is greater than or equal to the first predetermined threshold value, the target pixel is determined as the good state and, if otherwise, the target pixel is decided as the bad state; and (b12) providing the predicted pixel value of the target pixel by comparing the probability with a second predetermined threshold value.

3. The method as recited in claim 2, wherein, in the step (c), if the predicted pixel value is identical to the original pixel value, the mapping value has a binary value 0 and, if otherwise, the mapping value has a binary value 1.

4. The method as recited in claim 3, wherein the step (f) includes the steps of:

(f1) counting the number of mapping value 0's in the first and the second sequences to thereby provide the counted numbers;

(f2) detecting probability sets corresponding to the first and the second sequences, respectively, by using the counted numbers; and (f3) arithmetically encoding the first and the second sequences by using the probability sets to thereby output the encoded binary shape signal.

5. The method as recited in claim 4, wherein as the counted number increases, a larger probability is assigned to the mapping value 0 and a smaller probability is corresponded to the mapping value 1.

6. The method, as recited in claim 1, wherein the step (b) includes the steps of:

(b21) assigning a good state or a bad state to the target pixel by comparing the probability with a first and a second predetermined threshold values, wherein if the probability is greater than or equal to the first predetermined threshold value, or is smaller than the second predetermined threshold value, the target pixel is determined as the good state and, if otherwise, the target pixel is decided as the bad state; and (b22) providing the predicted pixel value of the target pixel by comparing the probability with a third predetermined threshold value.

7. An apparatus for encoding a binary shape signal including a plurality of binary blocks, each binary block having M×N binary pixels with M and N being positive integers, respectively, and each binary pixel having one of two different binary values which represent a background or an object pixel, respectively, comprising:

means for calculating a context number for each binary pixel in the binary block based on a corresponding context and detecting a probability corresponding to the context number, wherein the context is determined from binary pixels processed prior to said each binary pixel;

means for determining a state and a predicted pixel value of said each binary pixel by comparing the probability with predetermined threshold values;

means for computing a mapping value for said each binary pixel by comparing the predicted pixel value with an original pixel value thereof, wherein the mapping value represents whether the predicted pixel value is identical to the original pixel value or not;

means for producing a rearranged binary block, the binary block being rearranged into a first and a second sequences, wherein the first and the second sequences are constructed by classifying the binary pixels of the binary block according to the states thereof; and means for arithmetically encoding the first and the second sequences to thereby produce the encoded binary shape signal.

8. The apparatus according to claim 7, wherein the determining means includes:

means for assigning a good state or a bad state to said each binary pixel by comparing the probability with a first predetermined threshold value, wherein if the probability is greater than or equal to the first predetermined threshold value, said each binary pixel is determined as the good state and, if otherwise, said each binary pixel is decided as the bad state; and means for providing the predicted pixel value for said each binary pixel by comparing the probability with a second predetermined threshold value.

9. The apparatus according to claim 8, wherein if the predicted pixel value is identical to the original pixel value, the mapping value has a binary value 0 and, if otherwise, the mapping value has a binary value 1.

10. The apparatus according to claim 9, wherein the encoding means includes:

means for counting the number of mapping value 0's in the first and the second sequences to thereby provide the counted numbers;

means for detecting probability sets corresponding to the first and the second sequences, respectively, by using the counted numbers and providing a selection signal representing which probability sets are detected;

means for encoding the selection signal to thereby generate an encoded selection signal;

means for arithmetically encoding the first and the second sequences by using the probability sets to thereby output encoded binary shape data; and means for providing the encoded binary shape signal by multiplexing the encoded selection signal and the encoded binary shape data.

11. The apparatus according to claim 10, wherein as the counted number increases, a larger probability is assigned to the binary pixel having the mapping value 0 and a smaller probability is corresponded to the binary pixel having the mapping value 1.

12. The apparatus according to claim 7, wherein the determining means includes:

means for assigning a good state or a bad state to said each binary pixel by comparing the probability with a first and a second predetermined threshold values, wherein if the probability is greater than or equal to the first predetermined threshold value, or is smaller than the second predetermined threshold value, said each binary pixel is determined as the good state and, if otherwise, said each binary pixel is decided as the bad state; and means for providing the predicted pixel value for said each binary pixel by comparing the probability with a third predetermined threshold value.

13. An apparatus for decoding an encoded binary shape signal to thereby provide a decoded binary shape signal, comprising:

means for arithmetically decoding the encoded binary shape signal to thereby provide decoded binary shape data containing a first and a second sequences, wherein the first and the second sequences have reconstructed mapping values of binary pixels;

means for calculating a context number for each binary pixel based on a corresponding context and detecting a probability corresponding to the context number, wherein the context is determined from binary pixels reconstructed prior to said each binary pixel;

means for determining a state and a predicted pixel value of said each binary pixel by comparing the probability with predetermined threshold values;

means for taking one of the reconstructed mapping values for said each binary pixel from the first or the second sequence in response to the state of said each binary pixel; and means for reconstructing a binary pixel value of said each binary pixel by comparing the taken reconstructed mapping value with the predicted pixel value and sequentially providing the reconstructed binary pixel values corresponding to the decoded binary shape data as the decoded binary shape signal.

14. The apparatus of claim 13, wherein the decoding means decodes the encoded binary shape signal based on the same probability sets as used at an encoder which has provided the encoded binary shape signal.

15. The apparatus of claim 14, wherein if the state of said each binary pixel corresponds to the first sequence, the taken reconstructed mapping value is selected from the first sequence and, if otherwise, the taken reconstructed mapping value is detected from the second sequence.

* * * * *